United States Patent
Kertsman (10) Patent No.: US 10,384,268 B1
(45) Date of Patent: Aug. 20, 2019

(54) GROOVING INSERT HAVING REARWARDLY POINTING ARROWHEAD-SHAPED CHIP FORMER

(71) Applicant: Iscar, Ltd., Tefen (IL)

(72) Inventor: Oleg Kertsman, Kiryat Yam (IL)

(73) Assignee: Iscar, Ltd., Tefen (IL)

( * ) Notice: Subject to any disclaimer, the term of this patent is extended or adjusted under 35 U.S.C. 154(b) by 0 days.

(21) Appl. No.: 15/888,340

(22) Filed: Feb. 5, 2018

(51) Int. Cl.
  *B23B 27/04* (2006.01)
  *B23B 27/22* (2006.01)
  *B23B 27/16* (2006.01)

(52) U.S. Cl.
  CPC .......... *B23B 27/045* (2013.01); *B23B 27/16* (2013.01); *B23B 2200/081* (2013.01); *B23B 2200/321* (2013.01); *B23B 2200/328* (2013.01)

(58) Field of Classification Search
  CPC ........ B23B 2200/081; B23B 2200/328; B23B 2220/126; B23B 27/045; B23B 27/16; B23B 2200/321
  See application file for complete search history.

(56) References Cited

U.S. PATENT DOCUMENTS

| | | | | |
|---|---|---|---|---|
| 4,558,974 A | * | 12/1985 | Pano | B23B 27/045 407/110 |
| 5,423,639 A | * | 6/1995 | Wiman | B23B 27/045 407/116 |
| 5,511,911 A | * | 4/1996 | Katbi | B23B 27/045 407/114 |
| 5,676,495 A | * | 10/1997 | Katbi | B23B 27/045 407/114 |
| 5,704,737 A | * | 1/1998 | Alford | B23B 27/045 407/114 |
| 5,725,334 A | * | 3/1998 | Paya | B23B 27/045 407/104 |
| 5,827,017 A | * | 10/1998 | Tagstrom | B23B 27/045 407/116 |
| 5,951,215 A | * | 9/1999 | Paya | B23B 27/141 407/113 |
| 6,135,678 A | * | 10/2000 | Lundstrom | B23B 27/045 407/114 |

(Continued)

FOREIGN PATENT DOCUMENTS

| | | | | |
|---|---|---|---|---|
| EP | 0955116 A1 | * | 11/1999 | B23B 27/045 |
| JP | 02106204 A | * | 4/1990 | B23B 27/045 |

(Continued)

*Primary Examiner* — Sara Addisu
(74) *Attorney, Agent, or Firm* — Womble Bond Dickinson (US) LLP (57) ABSTRACT

A cutting insert has a cutting edge formed at an intersection of a rake surface and a relief surface, with a chip-control arrangement located at the rake surface. The chip-control arrangement includes a depression that includes a depression declining surface that extends downwardly in a direction away from the major cutting edge. A chip deflecting surface located rearward of the depression is inclined upwardly in a direction away from the major cutting edge. A chip former includes an interposed projection that extends from the chip deflecting surface to the depression declining surface, and two lateral protuberances that extend from opposite sides of the interposed projection to the depression declining surface beyond a forwardmost portion of the interposed projection.

41 Claims, 5 Drawing Sheets

(56) References Cited

U.S. PATENT DOCUMENTS

| | | | |
|---|---|---|---|
| 6,261,032 B1 | 7/2001 | Duwe et al. | |
| RE37,595 E * | 3/2002 | Lindstedt | B23B 27/045 407/110 |
| 7,510,355 B2 | 3/2009 | Havrda | |
| 7,665,933 B2 | 2/2010 | Nagaya et al. | |
| 8,784,014 B2 | 7/2014 | Onodera | |
| 9,168,588 B2 | 10/2015 | Kaufmann et al. | |
| 2003/0170081 A1 * | 9/2003 | Andersson | B23B 27/045 407/116 |
| 2006/0269367 A1 * | 11/2006 | Havrda | B23B 27/045 407/117 |
| 2008/0240874 A1 | 10/2008 | Nagaya et al. | |
| 2012/0210834 A1 * | 8/2012 | Onodera | B23B 27/045 82/1.11 |
| 2013/0058729 A1 | 3/2013 | Choi et al. | |
| 2013/0309028 A1 * | 11/2013 | Chistyakov | B23B 27/045 407/114 |
| 2015/0224581 A1 * | 8/2015 | Tsuda | B23B 27/045 407/66 |
| 2018/0093332 A1 * | 4/2018 | Abrahami | B23B 27/164 |

FOREIGN PATENT DOCUMENTS

| | | | | |
|---|---|---|---|---|
| JP | 2005288613 A | * | 10/2005 | |
| JP | 2008213122 A | * | 9/2008 | B23B 27/143 |

* cited by examiner

GROOVING INSERT HAVING REARWARDLY POINTING ARROWHEAD-SHAPED CHIP FORMER

FIELD OF THE INVENTION

The subject matter of the present application relates to a chip-control arrangement for a cutting insert. Such arrangement can be formed on a cutting insert configured for, inter alia, grooving cutting operations, and further in particular, internal grooving cutting operations.

BACKGROUND OF THE INVENTION

Cutting inserts can be provided with a chip-control arrangement for controlling the flow of and/or controlling the shape and size of the swarf and debris resulting from metalworking operations.

Such chip-control arrangements usually include recesses and/or projections located near a cutting edge of the insert. Upon encountering the recesses and/or projections, metal chips can be created with specific shapes and the chips can then be evacuated therefrom.

Various chip-control arrangements for grooving cutting operations are disclosed in U.S. Pat. Nos. 5,676,495, 5,725,334, 7,510,355, 7,665,933, 8,784,014 and 9,168,588.

SUMMARY OF THE INVENTION

In accordance with a first aspect of the subject matter of the present application there is provided a cutting insert comprising:

a cutting portion, having a cutting portion major axis defining a forward to rearward direction, the cutting portion comprising:
  a major cutting edge formed at an intersection of an upward facing rake surface and a forward facing major relief surface, wherein in a top view of the cutting portion, the major cutting edge has a cutting edge length which also defines a maximum width dimension of the cutting portion in a direction perpendicular to the cutting portion major axis;
  a chip-control arrangement at the rake surface comprising:
    a depression recessed in the rake surface, a forwardly disposed portion of the depression comprising a depression declining surface that extends downwardly in a direction away from the major cutting edge;
    a rake ascending surface formed on the rake surface, the rake ascending surface being inclined upwardly in a direction away from the major cutting edge, a portion of the rake ascending surface being disposed rearward of the depression forming a chip deflecting surface;
    an interposed projection extending along a projection longitudinal axis in the forward direction, from the chip deflecting surface to the depression declining surface; and
    two lateral protuberances extending from opposite sides of the interposed projection to the depression declining surface, each lateral protuberance extending along a respective protuberance longitudinal axis, beyond a forwardmost portion of the interposed projection.

It is understood that the above-said is a summary, and that features described hereinafter may be applicable in any combination to the subject matter of the present application, for example, any of the following features may be applicable to the cutting insert:

The interposed projection can be inclined upwardly in a direction away from the major cutting edge.

The two lateral protuberances can be inclined downwardly in a direction away from the major cutting edge.

The cutting portion can comprise two lateral minor cutting edges, formed at intersections of the rake surface and two opposing minor relief surfaces, the minor cutting edges merging with the major cutting edge at opposite ends thereof.

In the top view of the cutting portion, a majority of each lateral protuberance can be closer to the cutting portion major axis than to an adjacent one of the two minor cutting edges.

In the top view of the cutting portion, a majority of each lateral protuberance can be further from the cutting portion major axis than from an adjacent one of the two minor cutting edges.

In the top view of the cutting portion, the forwardmost portion of the interposed projection can have a concave shape as it extends between with the two lateral protuberances.

In the top view of the cutting portion, the two lateral protuberances can extend beyond the forwardmost portion of the interposed projection by a distance measured along the cutting portion major axis. The distance can be greater or equal to 0.1 mm and less than or equal to 0.5 mm.

At least a portion of the rake ascending surface can be formed in the depression.

The depression can adjoin the chip deflecting surface.

The rake ascending surface can be spaced apart from the major cutting edge.

The rake ascending surface can be spaced apart from the major cutting edge at least by a forwardly adjoining rake descending surface that can be inclined downwardly in a direction away from the major cutting edge.

At least a portion of the rake descending surface can be formed in the depression.

The rake surface can comprise a major land, adjacent, and extending along, the major cutting edge.

The major land can be planar.

The depression can be spaced apart from the major cutting edge by the major land.

In the top view of the cutting portion, the two lateral protuberances can be spaced apart from the major cutting edge by a protuberance distance, measured along the cutting portion major axis. The protuberance distance can be greater or equal to 0.1 mm and less than or equal to 0.5 mm.

The depression declining surface can extend downwardly from the major land at a depression exterior fillet surface having a radius.

The two lateral protuberances can extend from a rearward half of the interposed projection.

A rearwardly disposed portion of the depression can comprise a depression inclining surface that extends upwardly in a direction away from the major cutting edge.

The two lateral protuberances can extend from the rearward half of the interposed projection located at the depression inclining surface.

In the top view of the cutting portion, each of the two lateral protuberances can be narrower than the interposed projection in their respective widthwise directions.

The two lateral protuberances can be located completely within the depression.

The two lateral protuberances and the interposed projection can have substantially the same length.

In a first transverse plane perpendicular to the cutting portion major axis and intersecting the depression declining surface, the depression declining surface can have a straight profile.

In a second transverse plane perpendicular to the cutting portion major axis and intersecting the interposed projection, the interposed projection can have a concave profile.

In a third transverse plane perpendicular to the cutting portion major axis and intersecting the interposed projection rearwardly of the second transverse plane, the interposed projection can have a convex profile.

In a fourth transverse plane perpendicular to the cutting portion major axis and intersecting the interposed projection rearwardly of the third transverse plane, the interposed projection can have a convex profile.

In a second transverse plane perpendicular to the cutting portion major axis and intersecting either of the lateral protuberances, the lateral protuberance can have a convex profile.

The interposed projection and the two lateral protuberances can be lower than the major cutting edge.

The major cutting edge can comprise two curved major corner cutting edges and a major intermediate cutting edge extending therebetween. The major intermediate cutting edge can be longer than each of the two major corner cutting edges.

In the top view of the cutting portion, the major intermediate cutting edge can be straight.

The depression can be spaced apart from each of the two minor cutting edges by a respective minor land.

In the top view of the cutting portion, the projection longitudinal axis can be aligned with the cutting portion major axis.

In the top view of the cutting portion, each protuberance longitudinal axis can intersect the major cutting edge.

In the top view of the cutting portion, each protuberance longitudinal axis can converge with the projection longitudinal axis at a respective protuberance convergence angle, in a direction away from the major cutting edge.

The protuberance convergence angle can be greater or equal to 1° and less than or equal to 5°.

The protuberance convergence angle can be greater or equal to 40° and less than or equal to 50°.

The chip-control arrangement can be mirror symmetrical about an imaginary longitudinal plane containing the cutting portion major axis.

The depression can comprise a central depression inner portion and a circumferential depression outer portion that surrounds the depression inner portion and that is oriented transversely thereto. The depression declining surface can be located on the depression inner and outer portions.

The interposed projection can extend to the depression declining surface at the depression inner portion.

The two lateral protuberances can extend to the depression declining surface at the depression outer portion.

BRIEF DESCRIPTION OF THE FIGURES

For a better understanding of the present application and to show how the same may be carried out in practice, reference will now be made to the accompanying drawings, in which.

Where considered appropriate, reference numerals may be repeated among the figures to indicate corresponding or analogous elements.

DETAILED DESCRIPTION OF THE INVENTION

In the following description, various aspects of the subject matter of the present application will be described. For purposes of explanation, specific configurations and details are set forth in sufficient detail to provide a thorough understanding of the subject matter of the present application. However, it will also be apparent to one skilled in the art that the subject matter of the present application can be practiced without the specific configurations and details presented herein.

Figure 1A:
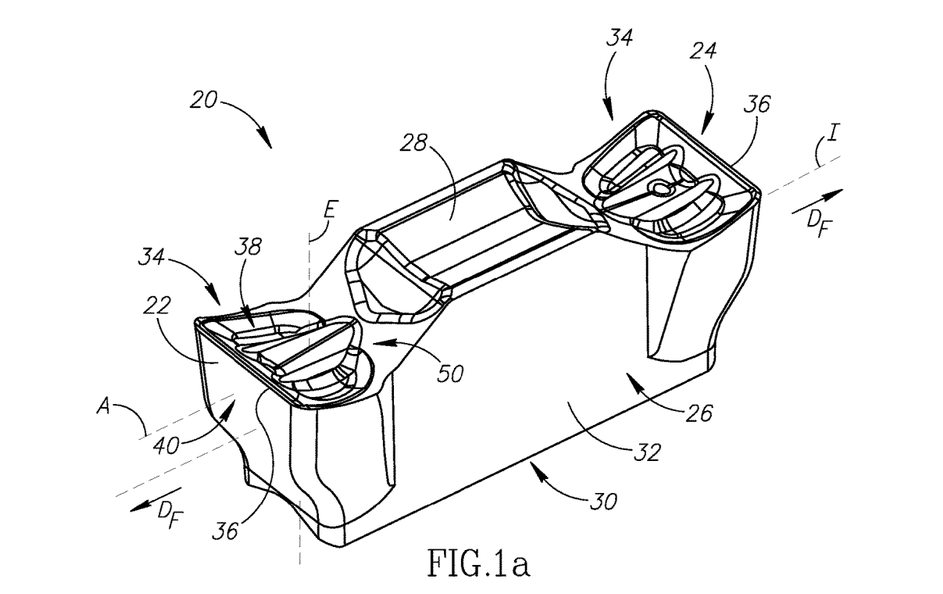
FIG. 1a is a perspective view of a cutting insert in accordance with a first embodiment of the present application.

Attention is first drawn to FIG. 1a, showing a cutting insert 20, in accordance with a first embodiment of the present application. The cutting insert 20 can be typically made from cemented carbide and can be coated with a wear-resistant material. In this non-limiting example shown in the drawings, the cutting insert 20 includes opposing insert front and rear end surfaces 22, 24 and an insert peripheral surface 26 that extends between the insert front and rear end surfaces 22, 24. The insert peripheral surface 26 extends about an insert central axis I. The insert central axis I can be a longitudinal axis so that the cutting insert 20 is elongated. The insert central axis I intersects the insert front and rear end surface 22, 24. The insert peripheral surface 26 includes opposing insert top and bottom surfaces 28, 30 that connect the insert front and rear end surfaces 22, 24. The insert peripheral surface 26 further includes two opposing insert side surfaces 32 that can connect the insert front and rear end surfaces 22, 24 and the insert top and bottom surfaces 28, 30. Thus, the cutting insert 20 can have a generally cuboid shape. It is also noticed that, in this non-limiting example, the cutting insert 20 is configured to be resiliently clamped in an insert pocket and is thus formed without a clamping hole for receiving a clamping member (such as a retaining screw) therethrough.

The cutting insert 20 includes a cutting portion 34, for providing metal removing ability to the cutting insert 20. In this non-limiting example shown in the drawings, the cutting insert 20 has two cutting portions 34, one located at each end of the cutting insert 20. However, it is understood that there could be just one, or additional, cutting portions 34.

Referring to FIGS. 1b-3b, the cutting portion 34 has a cutting portion major axis A defining a forward to rearward direction $D_F$, $D_R$. The cutting portion major axis A is parallel to, but not necessarily co-incident with, the insert central axis I. The cutting portion 34 also has a cutting portion minor axis E that is perpendicular to the cutting portion major axis A, and defines an upward to downward direction $D_U$, $D_D$, relative to the insert's top and bottom surfaces 28, 30. It should be appreciated that use of the terms "forward" and "rearward" throughout the description and claims refer to a relative position in a direction of the cutting portion major axis A, towards the right ($D_F$) and left ($D_R$), respectively, in FIGS. 2, 3a-3b and 11. Likewise, it should be appreciated that use of the terms "upward" and "downward" throughout the description and claims refer to a relative position in a direction parallel to the cutting portion minor axis E, upwards and downwards, respectively, in FIG. 2.

The cutting portion 34 includes a rake surface 38 formed on the insert top surface 28. The rake surface 38 is intersected by the cutting portion minor axis E and faces in the upward direction $D_U$. The cutting portion also includes a major relief surface 40 formed on the insert front end surface 22. The major relief surface 40 is intersected by the cutting portion major axis A and faces in the forward direction $D_F$.

Figure 3A:
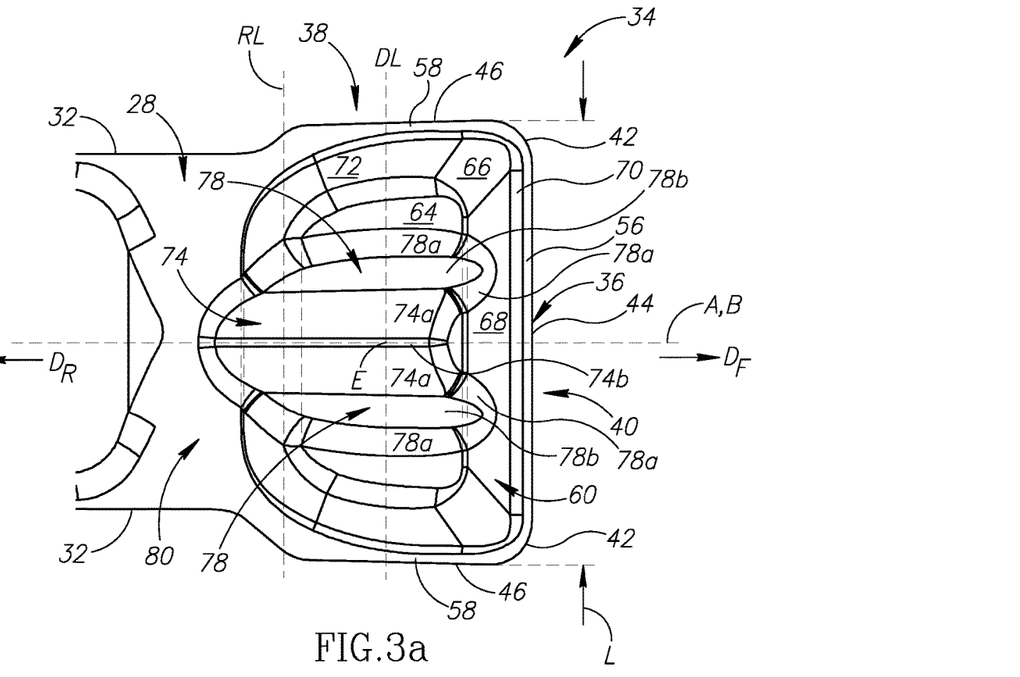
FIG. 3a is a top view of the cutting portion in FIG. 2.

The cutting portion 34 includes a major cutting edge 36 formed at an intersection of the rake surface 38 and the major relief surface 40. As shown in FIG. 3a, the major cutting edge 36 has a cutting edge length L, measured in a top view of the cutting portion 34, perpendicular to the cutting portion major axis A. In the top view of the cutting portion 34, the cutting edge length L defines the width of the groove cut in the work piece, and also establishes the maximum width of the cutting portion 34 in a direction perpendicular to the cutting portion major axis A. In accordance with some embodiments of the subject matter of the present application, the major cutting edge 36 can include two curved major corner cutting edges 42 and a major intermediate cutting edge 44 that extends between the two major corner cutting edges 42. Each major corner cutting edge 42 can be formed in the region of the intersection of the insert top surface 28, the insert front end surface 22 and a respective one of the two insert side surfaces 32. The major intermediate cutting edge 44 can be longer than each of the two major corner cutting edges 42. In the top view of the cutting portion 34, the major intermediate cutting edge 44 can be straight. The major cutting edge 36 can be mirror symmetrical about an imaginary longitudinal plane which contains the cutting portion major axis A and passes through the top and bottom surfaces 28, 30. Thus, the cutting portion major axis A may bisect the major cutting edge 36, in a top view of the cutting portion 34 (i.e. in a view in front of the rake surface 38 along the cutting portion minor axis E). It is noted however, also in this top view, that the cutting portion major axis A may be offset from the insert central axis I (see FIG. 3b).

In accordance with some embodiments of the subject matter of the present application, the cutting portion 34 can include two lateral minor cutting edges 46 formed at the intersections of the rake surface 38 and two opposing minor relief surfaces 48. The cutting insert 20 is thus configured for groove-turning cutting operations. The minor relief surfaces 48 are formed on the opposing insert side surfaces 32. The minor cutting edges 46 can merge with the major cutting edge 36 at opposite ends thereof. In a top view of the cutting portion 34, the minor cutting edges 46 can be straight. The minor cutting edges 46 can be generally perpendicular to the straight major intermediate cutting edge 44. Thus, in a top view of the cutting portion 34, the rake surface 38 can be substantially rectangular. In a side view of the cutting portion 34 (i.e. FIG. 2), the minor cutting edges 46 can be concavely curved.

The cutting portion 34 includes a chip-control arrangement 50 at the rake surface 38. It is understood that the cutting insert 20 in accordance with the subject matter of the present application could comprise one or more cutting portions 34 with such a chip-control arrangement 50 and one or more other cutting portions 34 which are devoid of any chip-control arrangement or which are formed with a different chip-control arrangement. The chip-control arrangement 50 is intended to control the flow and/or the shape and size of the swarf and debris resulting from metalworking operations. In accordance with some embodiments of the subject matter of the present application, the chip-control arrangement 50 can be mirror symmetrical about an imaginary longitudinal plane which contains the cutting portion major axis A and passes through the top and bottom surfaces 28, 30.

The chip-control arrangement 50 includes a rake ascending surface 52 formed on the rake surface 38. The rake ascending surface 52 is inclined upwardly in a direction away from the major cutting edge 36. In accordance with some embodiments of the subject matter of the present application, the rake ascending surface 52 can be spaced apart from the major cutting edge 36. The rake ascending surface 52 can be spaced apart from the major cutting edge 36 at least by a rake descending surface 54 formed on the rake surface 38. The rake descending surface 54 can be inclined downwardly in a direction away from the major cutting edge 36. The rake descending surface 54 can forwardly adjoin the rake ascending surface 52 and transitions therewith along a straight rake line RL that is oriented parallel to the intermediate cutting edge 44 and perpendicular to the cutting portion major axis A in a top view of the cutting portion 34.

Figure 3B:
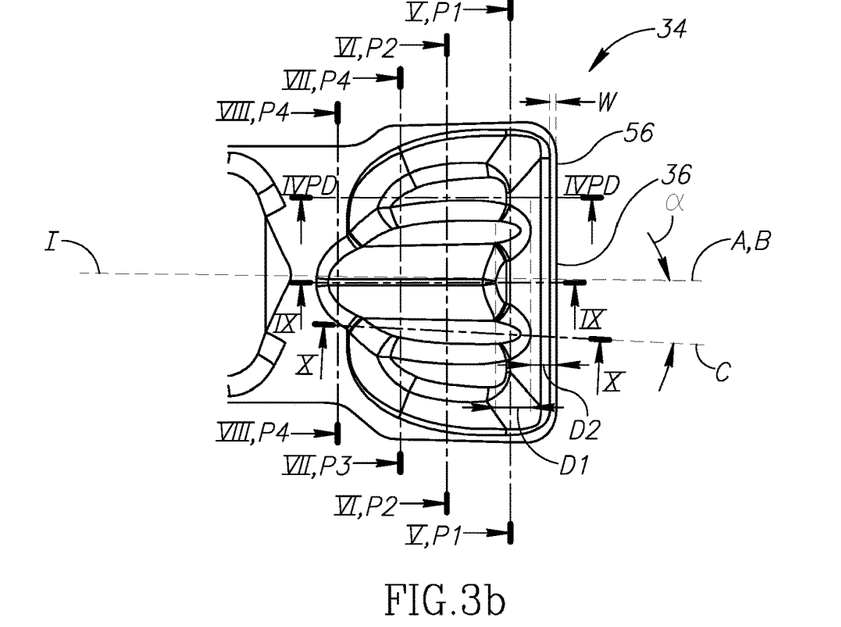
FIG. 3b is an analogous view to that shown in FIG. 3a for the purpose of indicating cross-sectional lines.

As shown in FIG. 3b, in accordance with some embodiments of the subject matter of the present application, the rake surface 38 can include a major land 56. The major land 56 acts to strengthen the major cutting edge 36, which is especially important when the cutting insert 20 is installed in a rotary slot milling tool, where the major cutting edges contact the work-piece in an interrupted manner. The major land 56 is adjacent, and extends along, the major cutting edge 36. The major land 56 can be planar. The major land 56 can have a major land width W. The major land width W can be in the range, 0.02 mm≤W≤0.1 mm. The rake surface 38 can include two minor lands 58. Each minor land 58 is adjacent, and extends along, a respective one of the minor cutting edges 46. The minor land 58 can merge with the major land 56 at opposite ends thereof.

The chip-control arrangement 50 includes a depression 60 that is recessed in the rake surface 38. Reference is made to FIG. 3a, which includes dashed lines to indicate the unseen contours of the depression 60. A portion of the rake ascending surface 52 is disposed rearward of the depression 60 to form a chip deflecting surface 62. In accordance with some embodiments of the subject matter of the present application, the depression 60 can adjoin the chip deflecting surface 62. At least a portion of the rake ascending surface 52 can be formed in the depression 60. Likewise, at least a portion of the rake descending surface 54 can be formed in the depression 60. The depression 60 can be spaced apart from the major cutting edge 36 by the major land 56. Likewise, the depression 60 can be spaced apart from each of the two minor cutting edges 46 by a respective one of the minor lands 58.

Figure 4:
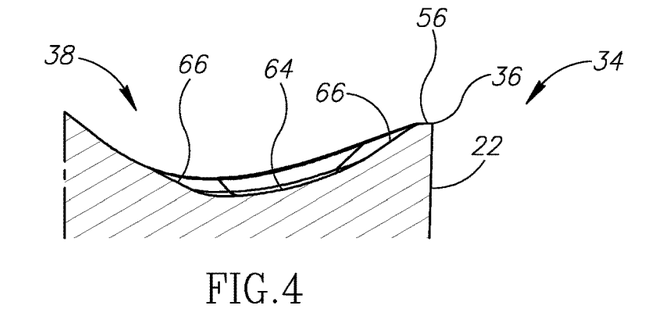
FIG. 4 is a cross section view taken along line IV-IV in FIG. 3b.

In accordance with some embodiments of the subject matter of the present application, the depression 60 can include a central depression inner portion 64 and a circumferential depression outer portion 66 that surrounds the depression inner portion 64. The depression outer portion 66 transitions into the rake surface 38. As seen in FIG. 4, showing a cross-section of the depression 60 in a depression plane PD which passes through the insert's top and bottom surfaces 28, 30 parallel to the cutting portion major axis A and intersects the depression 60, the depression inner portion 64 can be oriented transversely to the depression outer portion 66.

Figure 5:
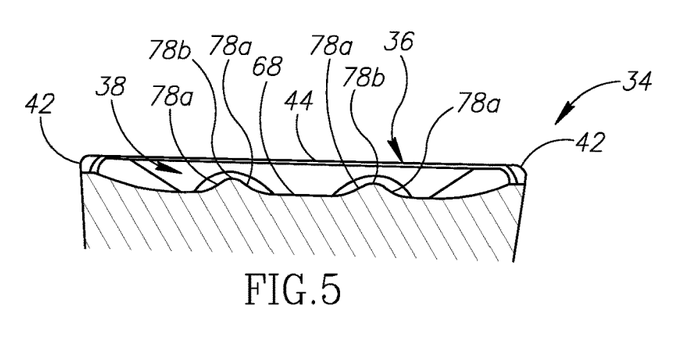
FIG. 5 is a cross section view taken along line V-V in FIG. 3b.

A forwardly disposed portion of the depression 60 includes a depression declining surface 68 that extends downwardly in a direction away from the major cutting edge 36. In accordance with some embodiments of the subject matter of the present application, the depression declining surface 68 can extend downwardly from the major land 56. The depression declining surface 68 can extend downwardly from the major land 56 at a depression exterior fillet surface 70 that has a radius. The depression exterior fillet surface 70 can extend around the complete circumference of the depression 60. The depression declining surface 68 can be located on the depression inner and outer portions 64, 66. As seen in the FIG. 5 cross-section, in accordance with some embodiments of the subject matter of the present application, in a first transverse plane P1 perpendicular to the cutting portion major axis A and intersecting the depression declining surface 68, the depression declining surface 68 can have a straight profile.

In accordance with some embodiments of the subject matter of the present application, a rearwardly disposed portion of the depression 60 can include a depression inclining surface 72 that extends upwardly in a direction away from the major cutting edge 36. The depression inclining surface 72 can rearwardly adjoin the depression declining surface 68 and transitions therewith along a straight depression line DL that is oriented perpendicular to the cutting portion major axis A in a top view of the cutting portion 34. The depression line DL can be located closer to the major cutting edge 36 than the rake line RL, Referring to FIGS. 1-3b, the chip-control arrangement 50 includes an interposed projection 74. The interposed projection 74 serves to curve the chip in the axial direction. The interposed projection 74 projects from the rake surface 38. The interposed projection 74 extends from the chip deflecting surface 62 to the depression declining surface 68. In accordance with some embodiments of the subject matter of the present application, the interposed projection 74 can extend to the depression declining surface 68 located on the depression inner portion 64. Stated differently, the interposed projection 74 may not extend to the depression outer portion 66. As seen in a side view of the cutting portion 34 (i.e. FIG. 2), the interposed projection 74 can be lower than the major cutting edge 36. The interposed projection 74 can be higher than the minor cutting edges 46, so that it is visible.

In accordance with some embodiments of the subject matter of the present application, the interposed projection 74 can extend longitudinally along a projection longitudinal axis B. The projection longitudinal axis B can be parallel to the cutting portion major axis A. In a top view of the cutting portion 34 (i.e. FIG. 3a), the projection longitudinal axis B can be aligned with the cutting portion major axis A.

Figure 6:
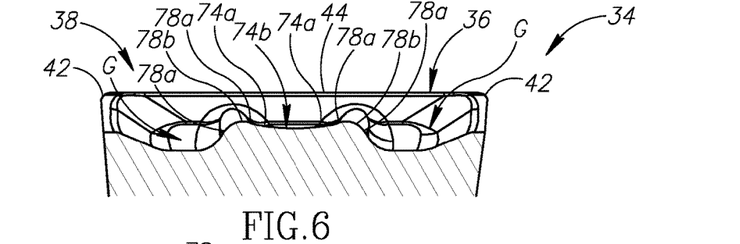
FIG. 6 is a cross section view taken along line VI-VI in FIG. 3b.
Figure 7:
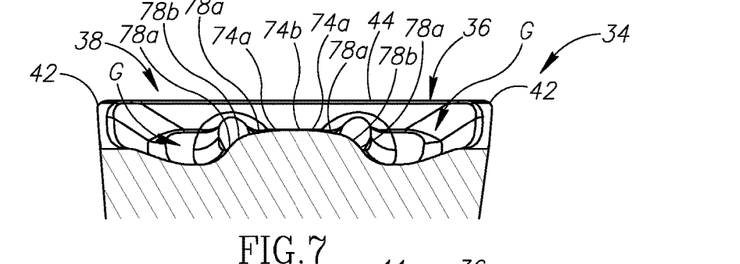
FIG. 7 is a cross section view taken along line VII-VII in FIG. 3b.
Figure 8:
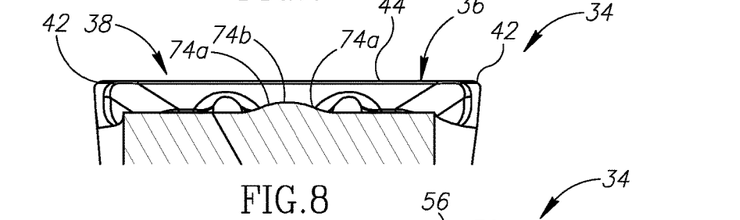
FIG. 8 is a cross section view taken along line VIII-VIII in FIG. 3b.

As seen in FIG. 6, in accordance with some embodiments of the subject matter of the present application, in a second transverse plane P2 perpendicular to the cutting portion major axis A and intersecting the interposed projection 74, the interposed projection 74 can have a concave profile. The second transverse plane P2 can be disposed at a forward half of the interposed projection 74. As seen in FIG. 7, in a third transverse plane P3 perpendicular to the cutting portion major axis A and intersecting the interposed projection 74 rearwardly of the second transverse plane P2, the interposed projection 74 can have a convex profile. The third transverse plane P3 can be disposed at a rearward half of the interposed projection 74. As seen in FIG. 8 in a fourth transverse plane P4 perpendicular to the cutting portion major axis A and intersecting the interposed projection 74 rearwardly of the third transverse plane P3, the interposed projection 74 has a convex profile. It is noted that the first to fourth transverse planes P1, P2, P3, P4 are parallel with each other and are ordered sequentially in a direction away from the major cutting edge 36.

Figure 9:
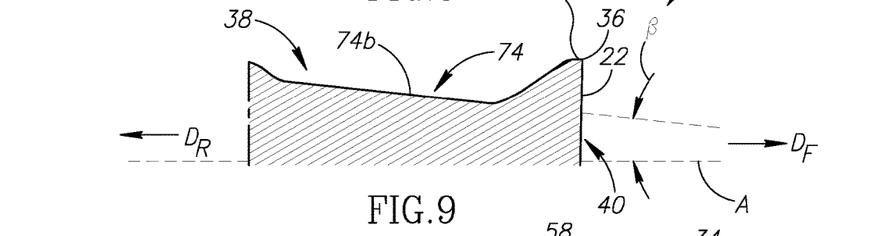
FIG. 9 is a cross section view taken along line IX-IX in FIG. 3b.

As seen in FIG. 3a, in accordance with some embodiments of the subject matter of the present application, the interposed projection 74 can include two projection flank surfaces 74a and a central projection ridge surface 74b that extends therebetween. The central projection ridge surface 74b can extend along the projection longitudinal axis B in a top view of the cutting portion 34. As seen in FIG. 9, in a longitudinal cross-section of the interposed projection 74 (i.e. containing the projection longitudinal axis B) passing through the central projection ridge surface 74b, the central projection ridge surface 74b can be inclined upwardly in a direction away from the major cutting edge 36 defining a projection inclination angle β with the cutting portion major axis A. The projection inclination angle β can be in the range $5° \le β \le 10°$.

Figure 1B:
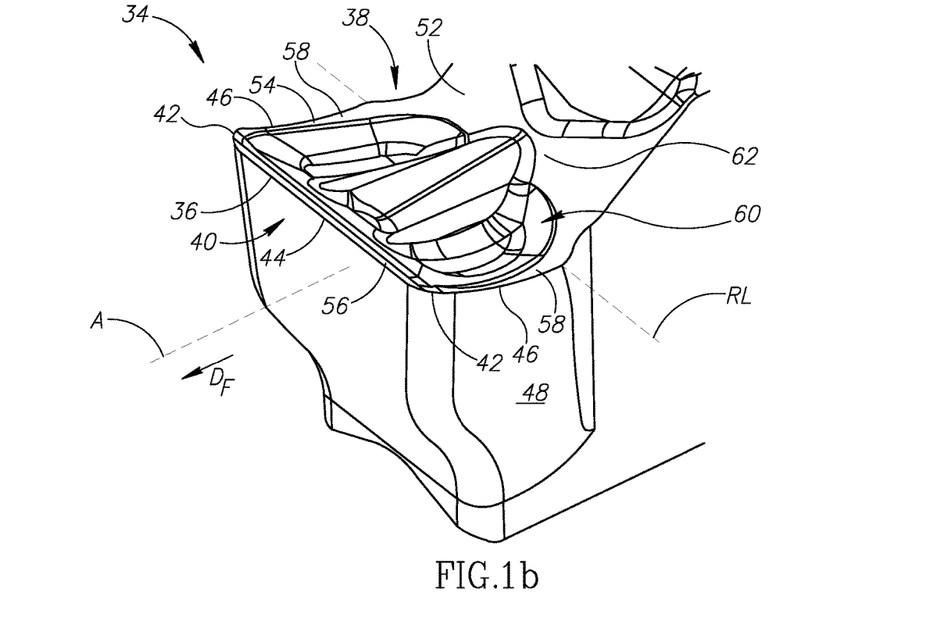
FIG. 1b is a detail of FIG. 1a, showing a cutting portion.
Figure 11:
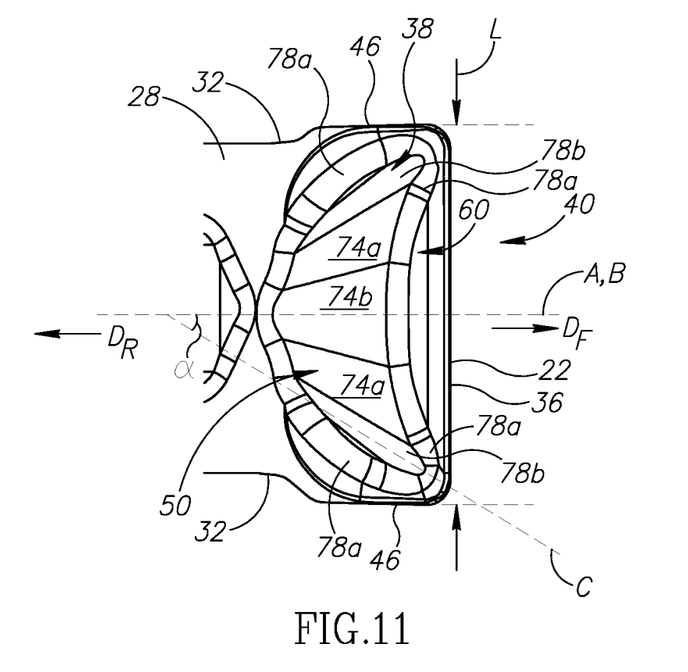
FIG. 11 is a top view of the cutting portion in accordance with a second embodiment of the present application.

Referring to FIGS. 1 and 3a, the chip-control arrangement 50 includes two lateral protuberances 78. The two lateral protuberances 78 serve to curve the chip in the lateral direction. The two lateral protuberances 78 project from the rake surface 38. The two lateral protuberances 78 extend from opposite sides of the interposed projection 74 to the depression declining surface 68 beyond a forwardmost portion of the interposed projection 74. As seen in FIG. 11, in accordance with some embodiments of the subject matter of the present application, in a top view of the cutting portion 34, the forwardmost portion of the interposed projection 74 can have a concave shape as it extends between with the two lateral protuberances 78.

Referring to FIG. 3b, in accordance with some embodiments of the subject matter of the present application, in the top view of the cutting portion 34 the two lateral protuberances 78 can extend beyond the forwardmost portion of the interposed projection 74 by a distance D1, measured along the cutting portion major axis A. The distance D1 can be in the range, $0.1 \text{ mm} \le D \le 0.5 \text{ mm}$. In the top view of the cutting portion 34, the two lateral protuberances 78 can be spaced apart from the major cutting edge 36 by a protuberance distance D2, measured along the cutting portion major axis A. The protuberance distance D2 can be in the range, $0.1 \text{ mm} \le D2 \le 0.5 \text{ mm}$. In accordance with some embodiments of the subject matter of the present application, the two lateral protuberances 78 can extend from a rearward half of the interposed projection 74. In particular, the two lateral protuberances 78 can extend from the rearward half of the interposed projection 74 located at the depression inclining surface 72. The two lateral protuberances 78 can extend to the depression declining surface 68 located on the depression outer portion 66. Thus, the two lateral protuberances 78 can be located completely within the depression 60. In the top view of the cutting portion 34, a majority of each lateral protuberance 78 can be closer to the cutting portion major axis A than to an adjacent one of the two minor cutting edges 46. Advantageously, a coolant gap G is thus formed between each lateral protuberance 78 and its adjacent minor cutting edge 46 of sufficient size to allow for coolant to flow and cool the cutting insert 20. In particular, the protuberance ridge surface 78b of each lateral protuberance 78 can be closer to the cutting portion major axis A than to an adjacent one of the two minor cutting edges 46. As seen in a side view of the cutting portion 34 (i.e. FIG. 2), the two lateral protuberances 78 can be lower than the major cutting edge 36. The two lateral protuberances 78 can be higher than the minor cutting edge 46, so that they is visible.

In accordance with some embodiments of the subject matter of the present application, each of the two lateral protuberances 78 can extend longitudinally along a respective protuberance longitudinal axis C. In a top view of the cutting portion 34, the protuberance longitudinal axis C can intersect the major cutting edge 36. In particular, the protuberance longitudinal axis C can intersect the major intermediate cutting edge 44. Each protuberance longitudinal axis C can converge with the projection longitudinal axis B at a respective protuberance convergence angle α, in a direction away from the major cutting edge 36. The protuberance convergence angle α can be in the range, $1° \leq \alpha \leq 5°$.

As seen in FIG. 6, in accordance with some embodiments of the subject matter of the present application, in the second transverse plane P2, the lateral protuberances 78 can have a convex profile. The second transverse plane P2 can be disposed at a middle third of the lateral protuberances 78.

Figure 2:
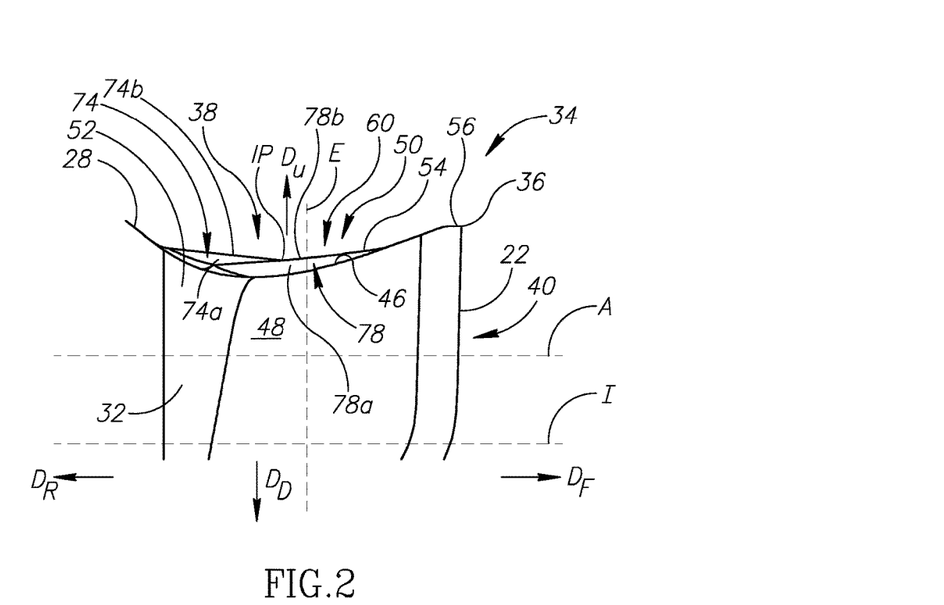
FIG. 2 is a side view of the cutting portion in FIG. 1b.
Figure 10:
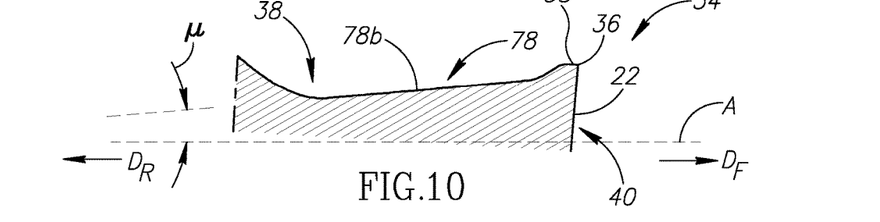
FIG. 10 is a cross section view taken along line X-X in FIG. 3b.

As seen in FIG. 3a, in accordance with some embodiments of the subject matter of the present application, each lateral protuberance 78 can include two protuberance flank surfaces 78a and a central protuberance ridge surface 78b that extends therebetween. The central protuberance ridge surface 78b can extend along the protuberance longitudinal axis C in a top view of the cutting portion 34. Each projection flank surface 74a can transition into an adjacent one of the protuberance flank surfaces 78a of each lateral protuberance 78. As seen in FIG. 10, in a longitudinal cross-section of the lateral protuberance 78 (i.e. containing the protuberance longitudinal axis C), the protuberance ridge surface 78b can be inclined downwardly in a direction away from the major cutting edge 36 defining a protuberance inclination angle μ with the cutting portion major axis A. The protuberance inclination angle μ can be in the range $5° \leq \mu \leq 10°$. It is noted that the interposed projection 74 and the two lateral protuberances 78 can be inclined upwardly in opposite axial directions. Thus, the central projection ridge surface 74b and the protuberance ridge surface 78b are not co-planar. As seen in FIG. 2, the interposed projection 74 intersects the two lateral protuberances 78 at an intersection point IP located generally mid-way along the depression 60 in a direction along the cutting portion major axis A.

The two lateral protuberances 78 and the interposed projection 74 together form a chip former 80. It is noted that, the two lateral protuberances 78 do not extend beyond a rearmost portion of the interposed projection 74 (in the rearward direction $D_R$). Thus, the interposed projection 74 is interposed between the two lateral protuberances 78 so that the chip former 80 has an arrowhead shape, with the interposed projection 74 serving as the central stem of the arrowhead and the two lateral protuberances 78 serving as the wings of the arrowhead. Furthermore, the arrowhead-shaped chip former is rearward pointing, with the tip of the arrowhead pointing in the rearward direction $D_R$, away from the major cutting edge 36. In accordance with some embodiments of the subject matter of the present application, in the top view of the cutting portion 34 each of the two lateral protuberances 78 can be narrower than the interposed projection 74 in their respective widthwise directions. The two lateral protuberances 78 and the interposed projection 74 can have substantially the same length.

The cutting insert 20 in accordance the first embodiment (i.e. FIGS. 1-10) has been found to be particularly effective when the cutting edge length L is approximately 2 mm.

Attention is now given to FIG. 11 showing the cutting insert 20 in accordance with a second embodiment. In this second embodiment, the protuberance convergence angle α can be in the range, $30° \leq \alpha \leq 40°$. In the top view of the cutting portion 34, a majority of each lateral protuberance 78 can be further from the cutting portion major axis A than from an adjacent one of the two minor cutting edges 46. In particular, the protuberance ridge surface 78b of each lateral protuberance 78 can be further from the cutting portion major axis A than from an adjacent one of the two minor cutting edges 46. This embodiment has been found to be particularly effective when the cutting edge length L is approximately 3 mm.

It should be noted that one feature of the subject matter of the present application is that the chip-control arrangement 22 has been found to be effective for both grooving and groove-turning cutting methods.

It should further be noted that one feature of the subject matter of the present application is that the chip-control arrangement 22 has been found to be effective for small cutting inserts, where space for a chip-control arrangement is limited.

Although the subject matter of the present application has been described to a certain degree of particularity, it should be understood that various alterations and modifications could be made without departing from the spirit or scope of the invention as hereinafter claimed.

What is claimed is:
1. A cutting insert (20) comprising:
a cutting portion (34), having a cutting portion major axis (A) defining a forward to rearward direction ($D_F$, $D_R$), the cutting portion (34) comprising:
a major cutting edge (36) formed at an intersection of an upward facing rake surface (38) and a forward facing major relief surface (40), wherein in a top view of the cutting portion (34), the major cutting edge (36) has a cutting edge length (L) which also defines a maximum width dimension of the cutting portion (34) in a direction perpendicular to the cutting portion major axis (A);
a chip-control arrangement (50) at the rake surface (38) comprising:
a depression (60) recessed in the rake surface (38), a forwardly disposed portion of the depression (60) comprising a depression declining surface (68) that extends downwardly in a direction away from the major cutting edge (36);
a rake ascending surface (52) formed on the rake surface (38), the rake ascending surface (52) being inclined upwardly in a direction away from the major cutting edge (36), a portion of the rake ascending surface (52) being disposed rearward of the depression (60) forming a chip deflecting surface (60);

an interposed projection (74) extending along a projection longitudinal axis (B) in the forward direction, from the chip deflecting surface (60) to the depression declining surface (68); and two lateral protuberances (78) extending from opposite sides of the interposed projection (74) to the depression declining surface (68), each lateral protuberance (78) extending along a respective protuberance longitudinal axis (C), beyond a forwardmost portion of the interposed projection (74), wherein the two lateral protuberances (78) are inclined downwardly in a direction away from the major cutting edge (36).

2. The cutting insert (20) according to claim 1, wherein the interposed projection (74) is inclined upwardly in a direction away from the major cutting edge (36).

3. A cutting insert (20) comprising:

a cutting portion (34), having a cutting portion major axis (A) defining a forward to rearward direction ($D_F$, $D_R$), the cutting portion (34) comprising:

a major cutting edge (36) formed at an intersection of an upward facing rake surface (38) and a forward facing major relief surface (40), wherein in a top view of the cutting portion (34), the major cutting edge (36) has a cutting edge length (L) which also defines a maximum width dimension of the cutting portion (34) in a direction perpendicular to the cutting portion major axis (A);

a chip-control arrangement (50) at the rake surface (38) comprising:

a depression (60) recessed in the rake surface (38), a forwardly disposed portion of the depression (60) comprising a depression declining surface (68) that extends downwardly in a direction away from the major cutting edge (36);

a rake ascending surface (52) formed on the rake surface (38), the rake ascending surface (52) being inclined upwardly in a direction away from the major cutting edge (36), a portion of the rake ascending surface (52) being disposed rearward of the depression (60) forming a chip deflecting surface (60);

an interposed projection (74) extending along a projection longitudinal axis (B) in the forward direction, from the chip deflecting surface (60) to the depression declining surface (68); and two lateral protuberances (78) extending from opposite sides of the interposed projection (74) to the depression declining surface (68), each lateral protuberance (78) extending along a respective protuberance longitudinal axis (C), beyond a forwardmost portion of the interposed projection (74), wherein, in the top view of the cutting portion (34), each of the two lateral protuberances (78) is narrower than the interposed projection (74) in their respective widthwise directions.

4. The cutting insert (20) according to claim 1, wherein the cutting portion (34) comprises two lateral minor cutting edges (46), formed at intersections of the rake surface (38) and two opposing minor relief surfaces (48), the minor cutting edges (46) merging with the major cutting edge (36) at opposite ends thereof.

5. The cutting insert (20) according to claim 4, wherein, in the top view of the cutting portion (34), a majority of each lateral protuberance (78) is closer to the cutting portion major axis (A) than to an adjacent one of the two minor cutting edges (46).

6. The cutting insert (20) according to claim 4, wherein the depression (60) is spaced apart from each of the two minor cutting edges (46) by a respective minor land (58).

7. The cutting insert (20) according to claim 1, wherein in the top view of the cutting portion (34), the forwardmost portion of the interposed projection (74) has a concave shape as it extends between with the two lateral protuberances (78).

8. The cutting insert (20) according to claim 1, wherein in the top view of the cutting portion (34):

the two lateral protuberances (78) extend beyond the forwardmost portion of the interposed projection (74) by a distance (D1) measured along the cutting portion major axis (A); and the distance (D1) is in the range, $0.1 \text{ mm} \leq (D1) \leq 0.5 \text{ mm}$.

9. The cutting insert (20) according to claim 1, wherein at least a portion of the rake ascending surface (52) is formed in the depression (60).

10. The cutting insert (20) according to claim 9, wherein the depression (60) adjoins the chip deflecting surface (62).

11. The cutting insert (20) according to claim 1, wherein the rake ascending surface (52) is spaced apart from the major cutting edge (36).

12. The cutting insert (20) according to claim 11, wherein the rake ascending surface (52) is spaced apart from the major cutting edge (36) at least by a forwardly adjoining rake descending surface (54) that is inclined downwardly in a direction away from the major cutting edge (36).

13. The cutting insert (20) according to claim 12, wherein at least a portion of the rake descending surface (54) is formed in the depression (60).

14. The cutting insert (20) according to claim 1, wherein the rake surface (38) comprises a major land (56), adjacent, and extending along, the major cutting edge (36).

15. The cutting insert (20) according to claim 14, wherein the major land (56) is planar.

16. The cutting insert (20) according to claim 14, wherein the depression (60) is spaced apart from the major cutting edge (36) by the major land (56).

17. The cutting insert (20) according to claim 16, wherein the depression declining surface (68) extends downwardly from the major land (56) at a depression exterior fillet surface (70) having a radius.

18. The cutting insert (20) according to claim 14, wherein in the top view of the cutting portion (34):

the two lateral protuberances (78) are spaced apart from the major cutting edge (36) by a protuberance distance (D2), measured along the cutting portion major axis (A); and the protuberance distance (D2) is in the range, $0.1 \text{ mm} \leq (D2) \leq 0.5 \text{ mm}$.

19. The cutting insert (20) according to claim 1, wherein the two lateral protuberances (78) extend from a rearward half of the interposed projection (74).

20. The cutting insert (20) according to claim 19, wherein:

a rearwardly disposed portion of the depression (60) comprises a depression inclining surface (72) that extends upwardly in a direction away from the major cutting edge (36); and the two lateral protuberances (78) extend from the rearward half of the interposed projection (74) located at the depression inclining surface (72).

21. The cutting insert (20) according to claim 1, wherein the two lateral protuberances (78) are located completely within the depression (60).

22. The cutting insert (20) according to claim 1, wherein the two lateral protuberances (78) and the interposed projection (74) have substantially the same length.

23. The cutting insert (20) according to claim 1, wherein in a first transverse plane (P1) perpendicular to the cutting portion major axis (A) and intersecting the depression declining surface (68), the depression declining surface (68) has a straight profile.

24. The cutting insert (20) according to claim 1, wherein in a second transverse plane (P2) perpendicular to the cutting portion major axis (A) and intersecting the interposed projection (74), the interposed projection (74) has a concave profile.

25. The cutting insert (20) according to claim 24, wherein in a third transverse plane (P3) perpendicular to the cutting portion major axis (A) and intersecting the interposed projection (74) rearwardly of the second transverse plane (P2), the interposed projection (74) has a convex profile.

26. The cutting insert (20) according to claim 25, wherein in a fourth transverse plane (P4) perpendicular to the cutting portion major axis (A) and intersecting the interposed projection (74) rearwardly of the third transverse plane (P3), the interposed projection (74) has a convex profile.

27. The cutting insert (20) according to claim 1, wherein in a second transverse plane (P2) perpendicular to the cutting portion major axis (A) and intersecting either of the lateral protuberances (78), the lateral protuberance (78) has a convex profile.

28. The cutting insert (20) according to claim 1, wherein the interposed projection (74) and the two lateral protuberances (78) are lower than the major cutting edge (36).

29. The cutting insert (20) according to claim 1, wherein:
the major cutting edge (36) comprises two curved major corner cutting edges (42) and a major intermediate cutting edge (44) extending therebetween; and
the major intermediate cutting edge (44) is longer than each of the two major corner cutting edges (42).

30. The cutting insert (20) according to claim 29, wherein in the top view of the cutting portion (34), the major intermediate cutting edge (44) is straight.

31. The cutting insert (20) according to claim 1, wherein in the top view of the cutting portion (34), the projection longitudinal axis (B) is aligned with the cutting portion major axis (A).

32. The cutting insert (20) according to claim 1, wherein in the top view of the cutting portion (34), each protuberance longitudinal axis (C) intersects the major cutting edge (36).

33. The cutting insert (20) according to claim 27, wherein in the top view of the cutting portion (34), each protuberance longitudinal axis (C) converges with the projection longitudinal axis (B) at a respective protuberance convergence angle ($\alpha$), in a direction away from the major cutting edge (36).

34. The cutting insert (20) according to claim 33, wherein the protuberance convergence angle ($\alpha$) is in the range, $1° \leq \alpha \leq 5°$.

35. The cutting insert (20) according to claim 33, wherein the protuberance convergence angle ($\alpha$) is in the range, $40° \leq \alpha \leq 50°$.

36. The cutting insert (20) according to claim 1, wherein the chip-control arrangement (50) is mirror symmetrical about an imaginary longitudinal plane containing the cutting portion major axis (A).

37. The cutting insert (20) according to claim 1, wherein:
the depression (60) comprises a central depression inner portion (64) and a circumferential depression outer portion (66) that surrounds the depression inner portion (64) and that is oriented transversely thereto; and
the depression declining surface (68) is located on the depression inner and outer portions (64, 66).

38. The cutting insert (20) according to claim 37, wherein the interposed projection (74) extends to the depression declining surface (68) at the depression inner portion (64).

39. The cutting insert (20) according to claim 37, wherein the two lateral protuberances (78) extend to the depression declining surface (68) at the depression outer portion (66).

40. A cutting insert (20) comprising:
a cutting portion (34), having a cutting portion major axis (A) defining a forward to rearward direction ($D_F$, $D_R$), the cutting portion (34) comprising:
a major cutting edge (36) formed at an intersection of an upward facing rake surface (38) and a forward facing major relief surface (40), wherein in a top view of the cutting portion (34), the major cutting edge (36) has a cutting edge length (L) which also defines a maximum width dimension of the cutting portion (34) in a direction perpendicular to the cutting portion major axis (A);
a chip-control arrangement (50) at the rake surface (38) comprising:
a depression (60) recessed in the rake surface (38), a forwardly disposed portion of the depression (60) comprising a depression declining surface (68) that extends downwardly in a direction away from the major cutting edge (36);
a rake ascending surface (52) formed on the rake surface (38), the rake ascending surface (52) being inclined upwardly in a direction away from the major cutting edge (36), a portion of the rake ascending surface (52) being disposed rearward of the depression (60) forming a chip deflecting surface (60);
an interposed projection (74) extending along a projection longitudinal axis (B) in the forward direction, from the chip deflecting surface (60) to the depression declining surface (68); and
two lateral protuberances (78) extending from opposite sides of the interposed projection (74) to the depression declining surface (68), each lateral protuberance (78) extending along a respective protuberance longitudinal axis (C), beyond a forwardmost portion of the interposed projection (74),
wherein,
the cutting portion (34) comprises two lateral minor cutting edges (46), formed at intersections of the rake surface (38) and two opposing minor relief surfaces (48), the minor cutting edges (46) merging with the major cutting edge (36) at opposite ends thereof; and
in the top view of the cutting portion (34), a majority of each lateral protuberance (78) is further from the cutting portion major axis (A) than from an adjacent one of the two minor cutting edges (46).

41. The cutting insert (20) according to claim 3, wherein the two lateral protuberances (78) are inclined downwardly in a direction away from the major cutting edge (36).

* * * * *